US012054016B2

(12) United States Patent
Corghi

(10) Patent No.: US 12,054,016 B2
(45) Date of Patent: Aug. 6, 2024

(54) WORKING HEAD FOR A TYRE CHANGING APPARATUS

(71) Applicant: NEXION S.p.A., Correggio (IT)

(72) Inventor: Giulio Corghi, Correggio (IT)

(73) Assignee: NEXION S.p.A., Correggio (IT)

( * ) Notice: Subject to any disclaimer, the term of this patent is extended or adjusted under 35 U.S.C. 154(b) by 200 days.

(21) Appl. No.: 17/545,196

(22) Filed: Dec. 8, 2021

(65) Prior Publication Data

US 2022/0185045 A1 Jun. 16, 2022

(30) Foreign Application Priority Data

Dec. 10, 2020 (IT) .................... 102020000030404

(51) Int. Cl.
*B60C 25/138* (2006.01)
(52) U.S. Cl.
CPC ................. *B60C 25/138* (2013.01)
(58) Field of Classification Search
CPC ............. B60C 25/135; B60C 25/138
See application file for complete search history.

(56) References Cited

U.S. PATENT DOCUMENTS

| 5,941,294 | A | 8/1999 | Cunningham et al. |
| 6,453,971 | B2 * | 9/2002 | Vignoli ............... B60C 25/0569 157/1.22 |

(Continued)

FOREIGN PATENT DOCUMENTS

| CN | 201694002 U | 1/2011 |
| EP | 1593533 A2 | 11/2005 |

(Continued)

OTHER PUBLICATIONS

Search Report issued in Italian Application No. 102020000030404 dated Sep. 8, 2021.

(Continued)

*Primary Examiner* — David B. Thomas
(74) *Attorney, Agent, or Firm* — United IP Counselors, LLC

(57) ABSTRACT

A working head (1) for an apparatus (100) for mounting and demounting a tyre to and from a corresponding rim (C) of a vehicle wheel comprises: a contoured element, having a first end (2A) and a second end (2B), spaced from each other along a longitudinal orientation (L) and including a demounting guide (22) and a mounting guide (21) juxtaposed with the demounting guide (22) along a transverse orientation (T) perpendicular to the longitudinal orientation (L);
a gripping tool (3), movable in a working plane perpendicular to the transverse orientation (T) between a gripping position (PP), where it is operatively interposed between the rim and the tyre, and a prising position (PS), where the gripping tool (3) is lifted longitudinally relative to the second end (2B) of the contoured element (2); a transmission unit (4) connectable to an actuator (103) and to the gripping tool (3) and configured to move the gripping tool (3).
The demounting guide (22) is interposed, along the transverse orientation (T), between the gripping tool (3) and the mounting guide (21) of the contoured element (2), the mounting guide being removably connected to an arm (102) of the apparatus (100).

16 Claims, 5 Drawing Sheets

(56) References Cited

U.S. PATENT DOCUMENTS

| | | | |
|---|---|---|---|
| 8,910,693 B2* | 12/2014 | Gonzaga | B60C 25/0578 |
| | | | 157/1.22 |
| 9,090,135 B2* | 7/2015 | Magnani | B60C 25/138 |
| 9,139,055 B2* | 9/2015 | Bonacini | B60C 25/0578 |
| 9,902,219 B2 | 2/2018 | Story | |
| 10,029,519 B2* | 7/2018 | Corghi | B60C 25/138 |
| 2011/0100558 A1* | 5/2011 | Corghi | B60C 25/056 |
| | | | 157/1.1 |
| 2012/0145333 A1* | 6/2012 | Gonzaga | B60C 25/138 |
| | | | 157/1.22 |
| 2013/0139973 A1* | 6/2013 | Bonacini | B60C 25/0578 |
| | | | 157/1.24 |
| 2014/0000813 A1* | 1/2014 | Story | B60C 25/0563 |
| | | | 157/1.24 |

FOREIGN PATENT DOCUMENTS

| | | |
|---|---|---|
| EP | 1944177 B1 | 12/2009 |
| EP | 2233325 A1 | 9/2010 |
| EP | 1625954 B1 | 12/2011 |
| EP | 2463125 A1 | 6/2012 |
| EP | 2650147 A1 | 10/2013 |
| EP | 2995476 A1 | 3/2016 |
| IT | 2008A000020 | 8/2009 |
| WO | 2010026539 A1 | 3/2010 |

OTHER PUBLICATIONS

Written Opinion issued in Italian Application No. 102020000030404 dated Sep. 8, 2021.

\* cited by examiner

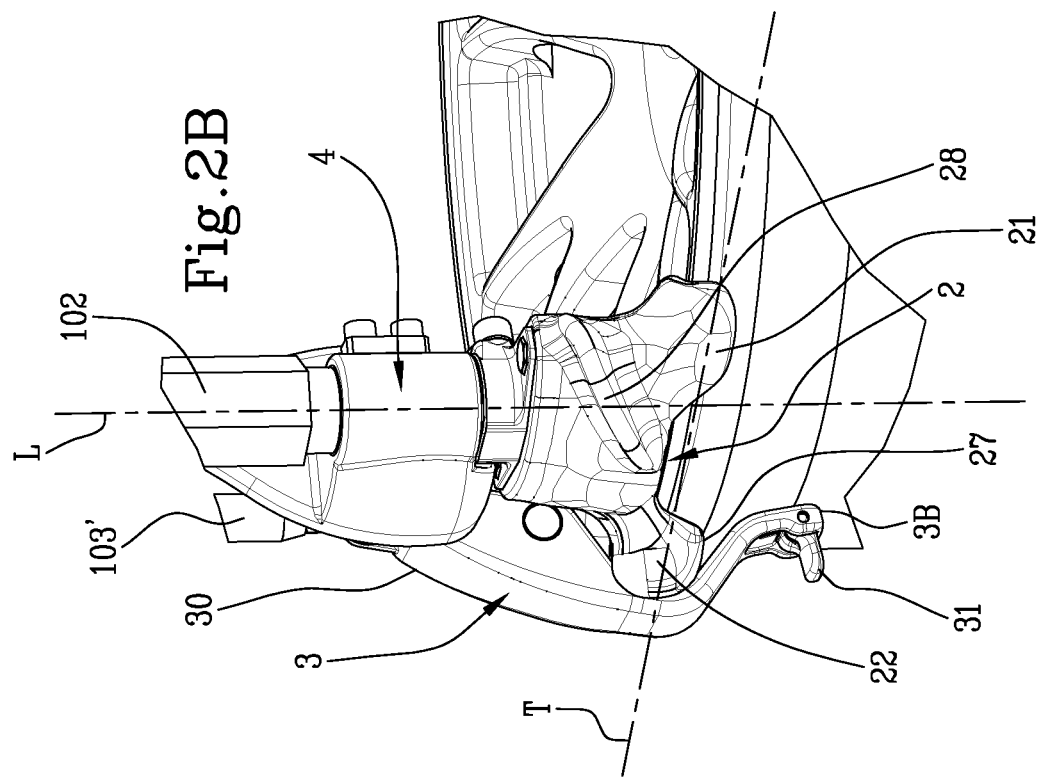
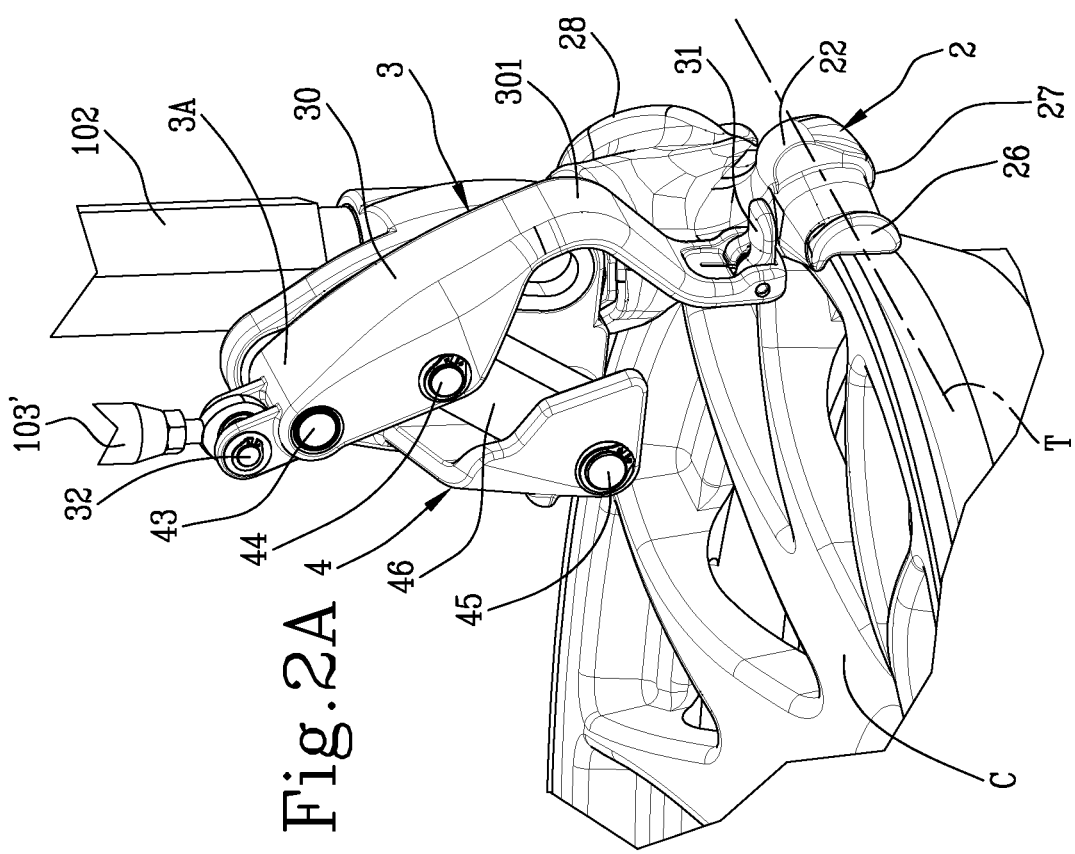

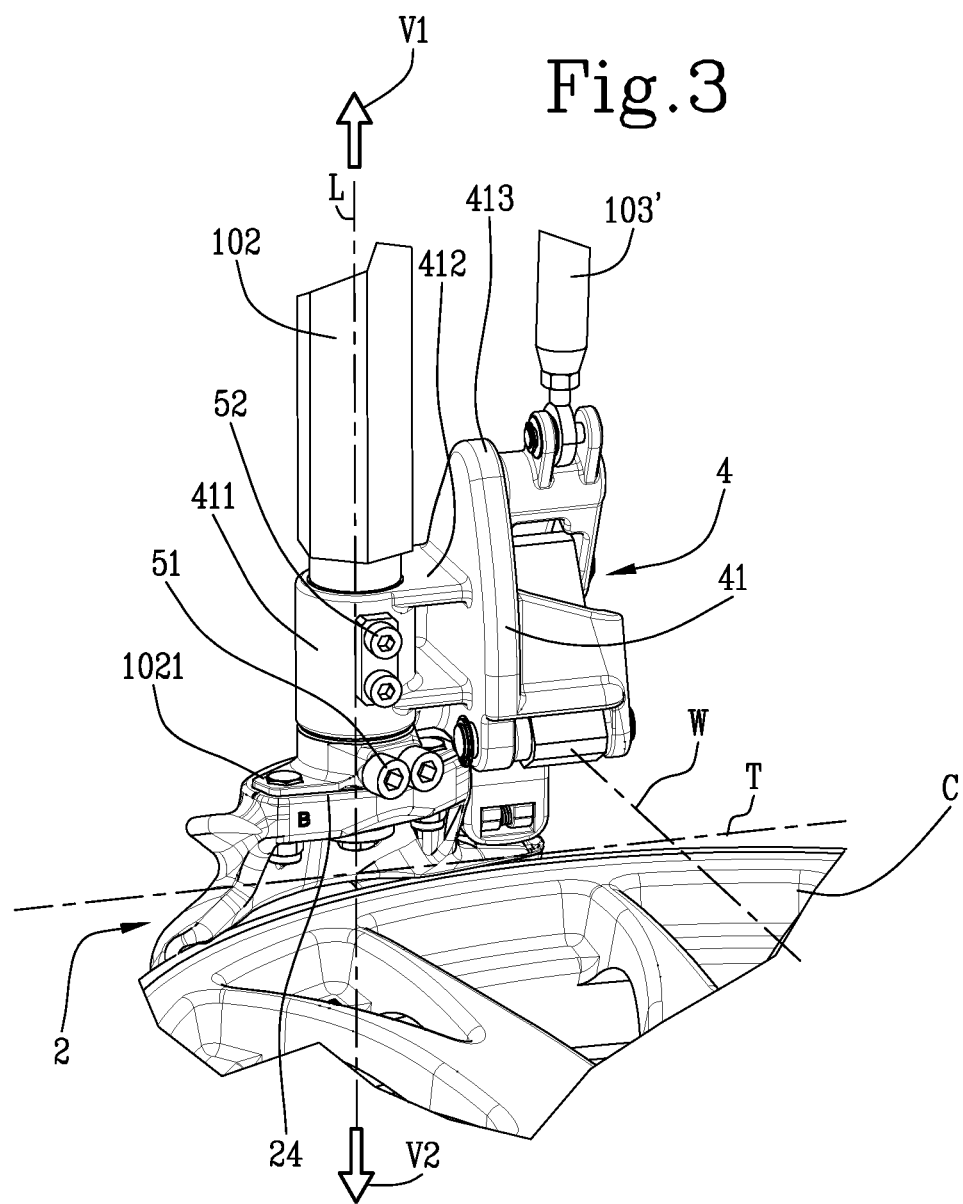

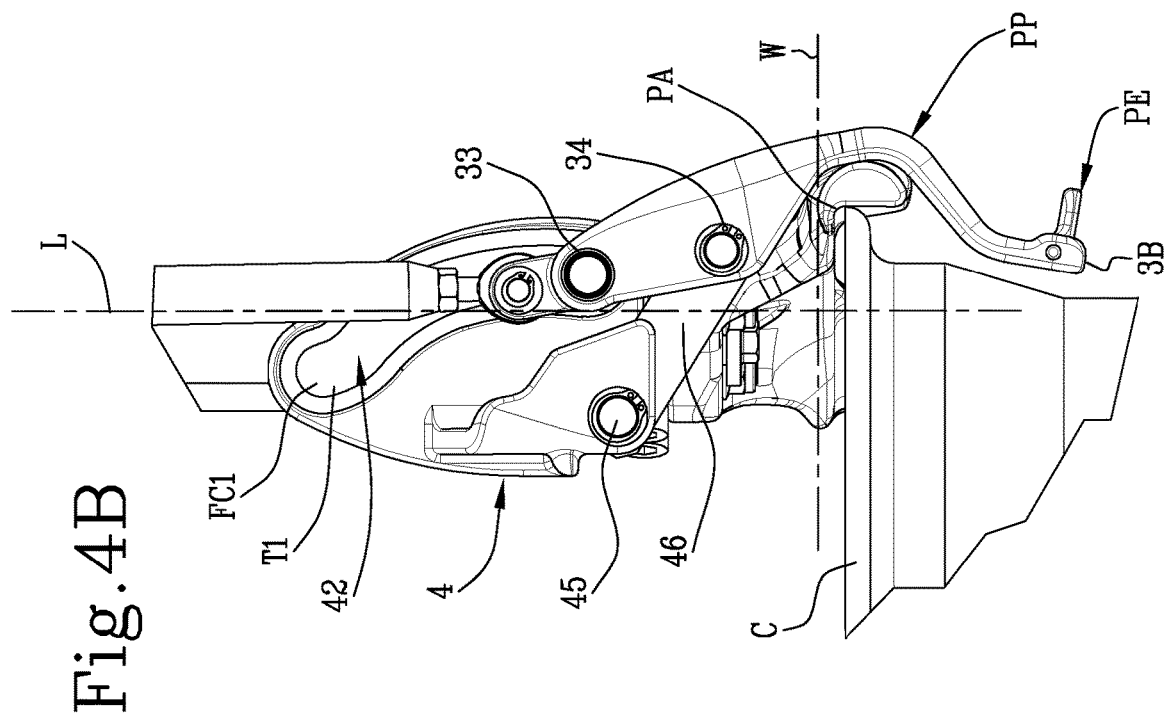
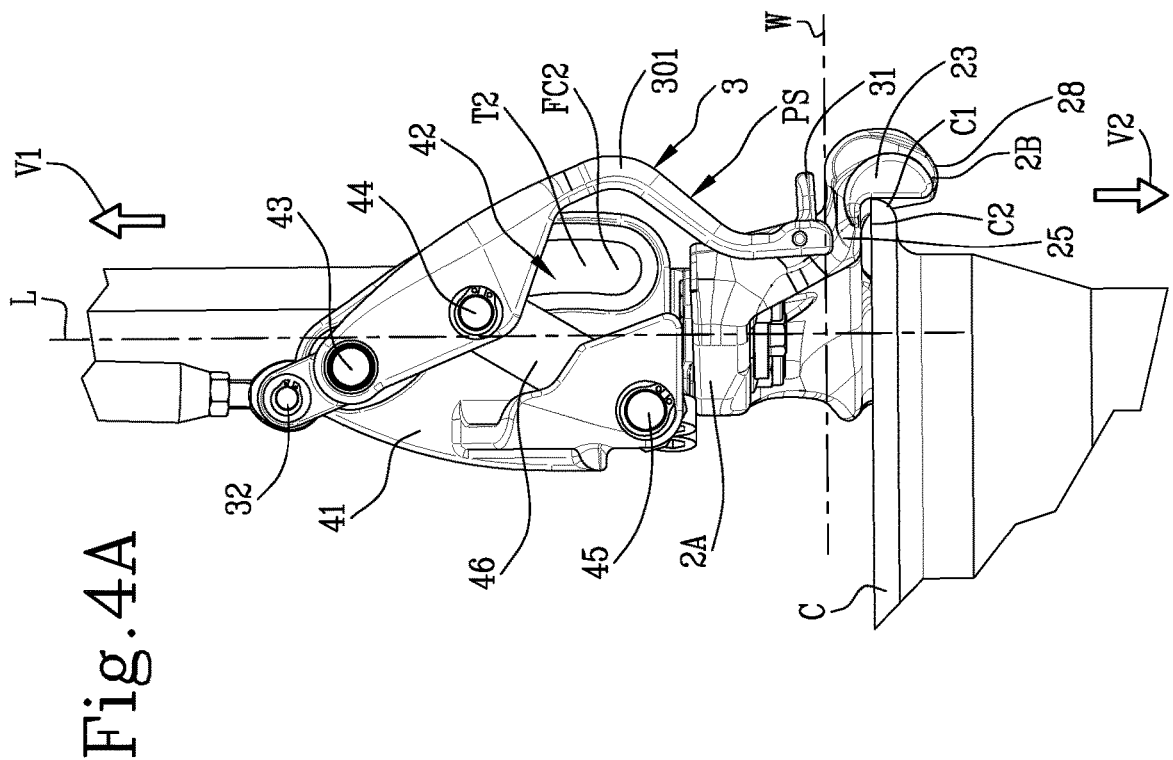

WORKING HEAD FOR A TYRE CHANGING APPARATUS

TECHNICAL FIELD

This invention relates to a working head for a tyre changing apparatus, to a tyre changing apparatus and to a method for mounting and demounting a tyre to and from a respective vehicle wheel rim.

BACKGROUND

In the prior art, tyre changing apparatuses provided with two tools are known. A first tool is a gripping tool designed to grip a tyre bead to allow the bead to be prised off the rim flange so that the tyre can be removed. The gripping tool is therefore movable between a gripping position, where it is interposed between the rim and the tyre to engage the tyre, and a prising position, where it is lifted away from the rim and, having engaged the tyre, keeps it lifted while the chuck turns, thereby allowing the bead all the way round the tyre to be prised off.

A second tool is a contoured element configured to facilitate the mounting and demounting operations. More specifically, the contoured element comprises a demounting guide, which slides on the tyre when the tyre is being demounted, and a mounting guide, which slides on the tyre when the tyre is being mounted.

In many of the solutions described, the gripping tool is a hand lever, for example a bar, which is operated manually using a part of the contoured element as the fulcrum. These solutions are described, for example, in documents U.S. Pat. Nos. 9,902,219B2 and 5,941,294 and have the obvious disadvantage of requiring manual operation which calls for considerable strength for the tyre to be removed.

To avoid this physical effort, systems have therefore been adopted in which the gripping tool is driven by an actuator which does away with the need to operate manually. Owing to the space occupied by the automatic gripping tool, however, these solutions do not use a contoured element, with the result that there is a higher risk of damaging the tyre sliding on the gripping tool during the demounting operation. These solutions are described, for example, in documents EP1625954B1 and EP1944177B1.

Also known are solutions where an actuator-driven gripping tool is used in combination with a contoured element. One such solution is described in document EP2233325B1. More specifically, document EP2233325B1 describes the presence of a demounting guide and a mounting guide on the contoured element. Also, the gripping tool is interposed between the demounting guide and the mounting guide of the contoured element. This configuration, however, is very inconvenient for carrying out maintenance and for replacing components, when necessary.

Another solution of this kind is described in document RE2008A000020. In this solution, the contoured element is made from a very hard, undeformable material which can damage the rim. In this regard, the document discloses the use of removable inserts which, however, need to be replaced very frequently. Moreover, in this solution, the contoured element is integrated (made as one) with a transmission unit which transfers the motion of the actuator to the gripping tool. Therefore, maintenance and replacement operations are complex and must be carried out together on all the components.

Other solutions of tyre changing apparatus including a working head are disclosed in the following documents: EP2463125A1, WO2010026539A1, EP1593533A2, EP2995476A1, CN201694002U and EP2650147A1. Also these documents illustrate solutions wherein manufacturing, maintenance and replacement operations are complex and must be carried out together on all the components.

BRIEF SUMMARY

This disclosure has for an aim to provide a working head, a tyre changing apparatus and a method for mounting and demounting a tyre to and from a vehicle wheel rim to overcome the abovementioned disadvantages of the prior art.

This aim is fully achieved by the working head, the tyre changing apparatus and the method for mounting and demounting a tyre as characterized in the appended claims.

According to an aspect of it, this disclosure provides a working head for a tyre changing apparatus.

The working head comprises a contoured element. The contoured element is made of a polymeric material. In an embodiment, the polymeric material is plastically compliant.

In one example, the contoured element is made by a moulding process. Preferably, the countered element is made by injection moulding. In other examples, the countered element is made by compression moulding.

The working head comprises a first end and a second end which are spaced from each other along a longitudinal orientation. The first end faces in a first direction (of the longitudinal orientation). The first end defines a connecting zone of the contoured element. The second end faces in a second direction, opposite to the first direction. The second end defines a supporting zone of the contoured element. The supporting zone of the contoured element is adapted to abut against the wheel rim when the contoured element is in sliding contact with the wheel rim in the supporting zone.

In an embodiment, the contoured element includes a demounting guide. The demounting guide is adapted to come into sliding contact to guide the wheel tyre. In an embodiment, the contoured element comprises a mounting guide. The mounting guide is juxtaposed with the demounting guide along a transverse orientation perpendicular to the longitudinal orientation. The mounting guide is adapted to guide the tyre when the tyre is being mounted to the respective rim.

The working head comprises a gripping tool. The gripping tool is movable in a working plane between a gripping position, where it is operatively interposed between the rim and the tyre, and a prising position, where the gripping tool is lifted longitudinally (that is, it is moved away in the first direction of the longitudinal orientation) relative to the second end of the contoured element. In an embodiment, the gripping tool is made of metallic material.

In an embodiment, the working plane is perpendicular to the transverse orientation. In an embodiment, the working plane is inclined to the transverse orientation.

In one example the working plane is the plane wherein the gripping tool remains during its movement between the gripping and the prising position. This plane is parallel to the longitudinal orientation.

The working head comprises a transmission unit. The transmission unit is connectable to an actuator. The transmission unit is connected to the gripping tool. The transmission unit is configured to move the gripping tool between the gripping position and the prising position responsive to a movement of the actuator.

In an embodiment, the demounting guide (of the contoured element) is interposed between the gripping tool and the mounting guide of the contoured element along the transverse orientation. In an embodiment, the contoured element is removably connected to an arm of the apparatus.

This enables the contoured element to be easily removed from the working head to allow the contoured element to be changed quickly when it needs to be replaced.

In an embodiment, the contoured element includes an arcuate profile, preferably at its second end. The arcuate profile is configured to rest on the wheel rim. The arcuate profile comprises a longitudinal portion, operatively disposed between the rim and the tyre. The longitudinal portion facilitates demounting operations.

In an embodiment, the contoured element is connectable to the arm by a first connector. In an embodiment, the transmission unit is connectable to the arm of the apparatus by a second connector. Advantageously, the second connector is separate from the first connector. Thus, replacing the contoured element, if necessary, does not require removal of the gripping tool. This reduces the time needed for replacement and the probability of human error when remounting the working head.

In an embodiment, the contoured element impinges on the working plane. In other words, the contoured element is operatively interposed, along a working orientation perpendicular to the transverse orientation and to the longitudinal orientation, between the rim and the gripping tool when the latter is at the gripping position. Therefore, the gripping tool, which is made preferably of hard metallic material, is prevented from impacting against the rim and thus damaging it.

In an embodiment, the transmission unit comprises a transformation mechanism. The transformation mechanism is configured to transform a linear movement of the actuator into an operating path of the gripping tool. Preferably, the operating path of the tool includes at least one curved stretch.

In an embodiment, the transformation mechanism comprises a slot. The gripping tool is connected to the transmission unit at a first hinge. The first hinge is slidable in the slot responsive to the linear movement of the actuator.

In an embodiment, the slot comprises a first limit stop. The first limit stop corresponds to the prising position of the gripping tool. The slot comprises a second limit stop, corresponding to the gripping position of the gripping tool. The slot comprises a first stretch, having a first profile. In an embodiment, the slot comprises a second stretch, distinct from the first stretch and having a second profile. The second profile is, advantageously, different from the first profile. In effect, this allows adapting the movements of the gripping tool and of an end thereof along the operating path of the gripping tool, in order to avoid obstacles such as, for example, the contoured element or the edge of the wheel rim.

In an embodiment, the first stretch of the slot includes the first limit stop.

In an embodiment, the transmission unit comprises a support. In an embodiment, the transmission unit comprises a lever. The lever rotates relative to the support about a second hinge.

In an embodiment, the gripping tool is connected to the lever by a third hinge. These kinematic connections allow obtaining a suitable operating path for the gripping tool.

In an embodiment, the gripping tool is in the form of an elongate lever (or elongate element extending between a first and a second end). In an embodiment, the elongate lever has a free end, preferably with a hooked shape. In other words, the gripping tool comprises a claw (or hook).

The claw is movable between a retracted position and an extracted position, where it operatively protrudes from the elongate element towards the tyre along a working direction, perpendicular to the longitudinal orientation and to the transverse orientation.

In an embodiment, the gripping tool comprises a gripping end, which adopts a first position, at the prising position (or at the gripping position) of the gripping tool. In an embodiment, the gripping end corresponds to the second end of the body of the gripping tool. In an embodiment, the gripping end corresponds to the claw of the gripping tool. The gripping end adopts a second position at a position of the gripping tool between the gripping position and the prising position.

In an embodiment, the claw (the hook) is retractable from the body of the gripping tool. More specifically, the hook rotates relative to the body of the gripping tool between an extracted position, where it protrudes from the body of the gripping tool along the working orientation, and a retracted position, where it is substantially contained within a plane defined by the longitudinal orientation and the transverse orientation. The hook comprises a first end, connected to the body of the gripping tool. The hook comprises a second end, opposite to the first end and configured to grip the tyre. In an embodiment, the hook comprises a bulge (or knuckle), located at the second end. When the hook is at the extracted position, the bulge rises along the longitudinal orientation to define a shoulder to the tyre being gripped by the gripping tool so as to allow the tyre to slide more steadily and easily on the gripping tool.

In an embodiment, the contoured element comprises a tongue. The tongue is at an advanced position relative to the supporting zone, along the longitudinal orientation in the second direction. That way, when the contoured element is in contact with the tyre, the tongue operatively projects from the rim flange along the working orientation.

In an embodiment, the gripping tool has a thickness along an orientation perpendicular to the working orientation. Therefore, the gripping tool extends along an orientation perpendicular to the working orientation between a first flank and a second flank. In an embodiment, the orientation perpendicular to the working orientation is parallel to the transverse orientation (that is, the tool has a thickness along the transverse orientation). In other embodiments, on the other hand, the orientation perpendicular to the working orientation is inclined to the transverse orientation. In these embodiments, the working orientation is inclined to the radial orientation of the wheel; that is to say, it does not pass through the axis of rotation of the wheel. Thus, the working plane is also inclined to the transverse orientation and does not pass through the axis of rotation of the wheel.

In these embodiments, the inclination of the working plane relative to the transverse orientation causes the first flank to move closer towards the rim. This movement closer towards the rim reduces the stress on the tyre because the point of contact between the tool and the tyre (bead) is closer to the rim. This reduces the probability of damage.

In an embodiment, the mounting tool has a curved profile in a plane perpendicular to the longitudinal orientation. In effect, this curved shape, which follows that of the rim, brings the first and/or the second flank of the gripping tool closer to the rim (that is, moves the point of contact closer to the rim), thereby reducing the stress on the tyre in this case, too.

More generally speaking, in an embodiment, the first flank, on which the point of contact with the tyre is located, is less thick than the second flank, so as to reduce the distance between bead and rim to limit the stress on the tyre.

According to one aspect of it, this disclosure provides a tyre changing apparatus for mounting and/or demounting a tyre to or from a vehicle wheel rim. The apparatus comprises a frame. The frame includes a column. The apparatus comprises a chuck. The chuck rotates about an axis of rotation. The chuck is configured to set the wheel in rotation.

The apparatus comprises a working arm. The working arm is preferably connected to the column. The working arm is preferably oriented, at least partly, along the longitudinal orientation.

The apparatus comprises a working head having one or more of the features described in this disclosure. The working head is connected to the working arm. The working head is reciprocally movable towards and away from the chuck along the longitudinal orientation parallel to the axis of rotation.

In an embodiment, the working head is also movable along the working orientation (radial orientation) to adapt to rims of different diameter. In other embodiments, the working head is configured to move closer to the rim by tilting about an axis that is parallel to the axis of rotation of the rim itself.

The apparatus comprises an actuator. The actuator is connected to the transmission unit of the working head in order to drive the gripping tool.

According to one aspect of it, this disclosure provides a method for demounting a tyre from a vehicle wheel rim using a tyre changing apparatus. The method comprises a step of positioning the wheel on a chuck of the tyre changing apparatus.

The method comprises a step of moving a working head of the apparatus towards the chuck along a longitudinal orientation, parallel to the axis of rotation.

In an embodiment, the method comprises a step of moving the working head along the working orientation (radial orientation) perpendicular to the longitudinal orientation to adapt to the diameter of the rim.

The method comprises a step of resting a contoured element of polymeric material, forming part of the apparatus, on the wheel rim at a supporting zone of the contoured element. The contoured element includes a demounting guide, adapted to come into sliding contact with a tyre bead so as to guide the wheel tyre, and a mounting guide, juxtaposed with the demounting guide along a transverse orientation perpendicular to the longitudinal orientation and adapted to guide the tyre while it is being mounted on the respective rim.

The method comprises a step of moving a gripping tool in a working plane which, in one embodiment, includes the axis of rotation and is perpendicular to the transverse orientation. In other embodiments, the working plane is inclined to the transverse orientation. In the step of gripping, the gripping tool moves between a gripping position, where it is interposed between the rim and the tyre, and a prising position, where the gripping tool is lifted from the rim. The step of moving the gripping tool is carried out by an actuator through a transmission unit included in the working head.

The method comprises a step of rotating the chuck about an axis of rotation. The method comprises a step of guiding the tyre with the demounting guide of the contoured element while the wheel rotates.

The demounting guide used for implementing the method is interposed between the mounting guide and the gripping tool along the transverse orientation.

In an embodiment, the method comprises a step of replacing the contoured element. In the step of replacing, the contoured element is removed from the working head so it can be replaced with a new contoured element.

In an embodiment, the method comprises a step of protecting. In the step of protecting, the contoured element is interposed between the gripping tool and the rim, in the working plane, to prevent damage to the rim due to impact against the gripping tool.

In an embodiment, the method of this disclosure is also suitable for mounting the tyre to the respective rim. In this embodiment, the method comprises a step of inserting the tyre using an inserting portion of the contoured element. The method comprises a step of guiding the bead with the mounting guide during the mounting operation.

BRIEF DESCRIPTION OF THE DRAWING FIGURES

These and other features will become more apparent from the following detailed description of a preferred embodiment, illustrated by way of non-limiting example in the accompanying drawings, in which:

FIGS. 2A and 2B show a first perspective view of a working head of the apparatus of FIG. 1 with a gripping tool at a prising position and at a gripping position, respectively;

FIG. 3 shows a second perspective view of the working head of FIG. 2;

FIGS. 4A and 4B show a cross section of the working head of FIGS. 2A and 2B with a gripping tool at a prising position and at a gripping position, respectively;

Figure 1:
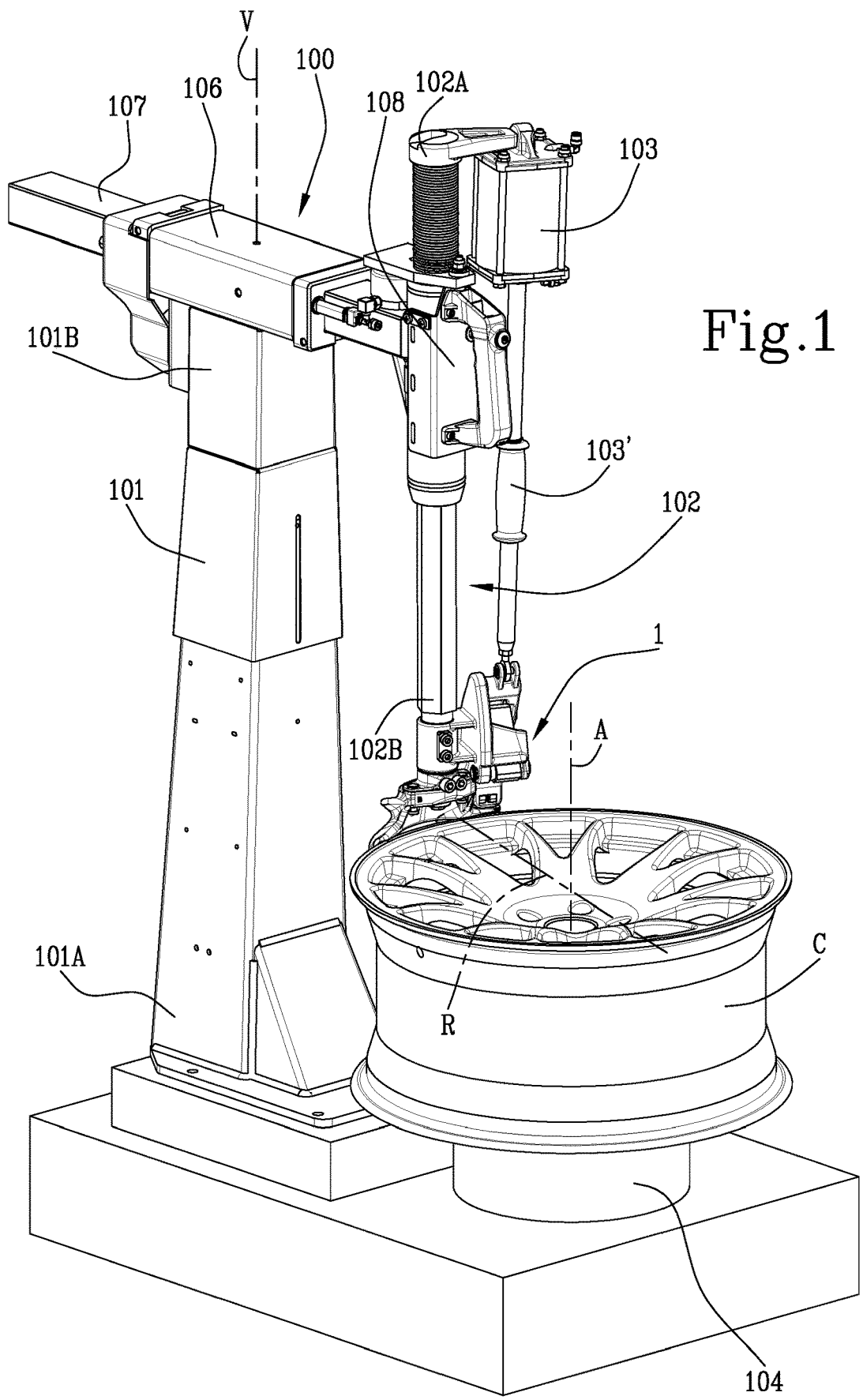
FIG. 1 illustrates a tyre changing apparatus according to this disclosure.
Figure 5A:
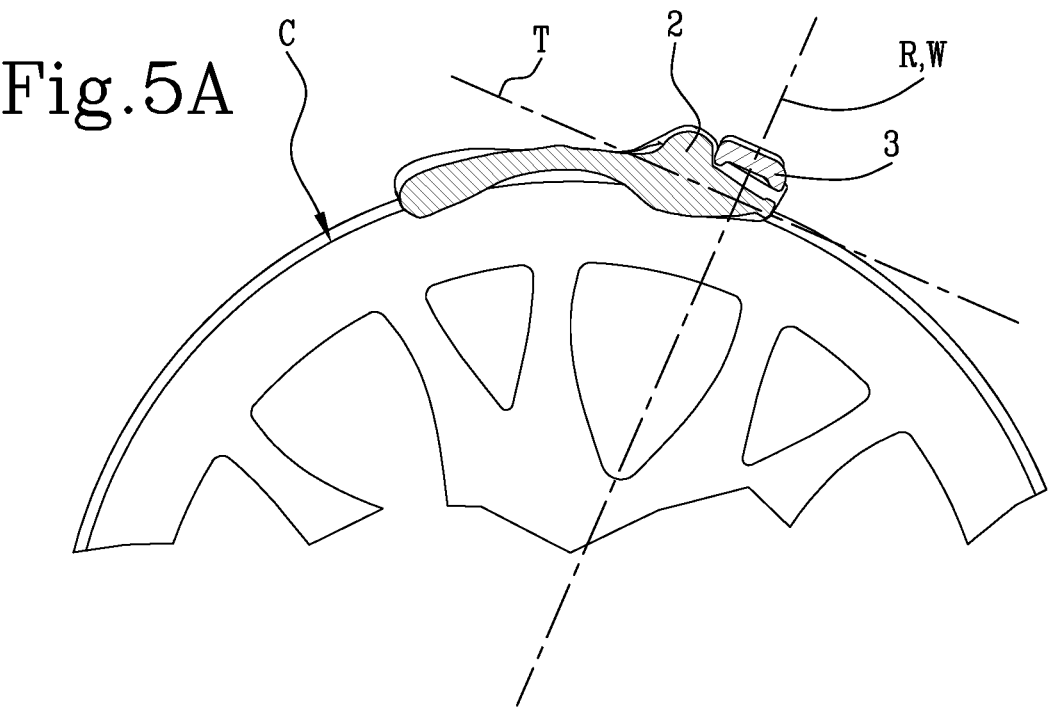
Figure 5B:
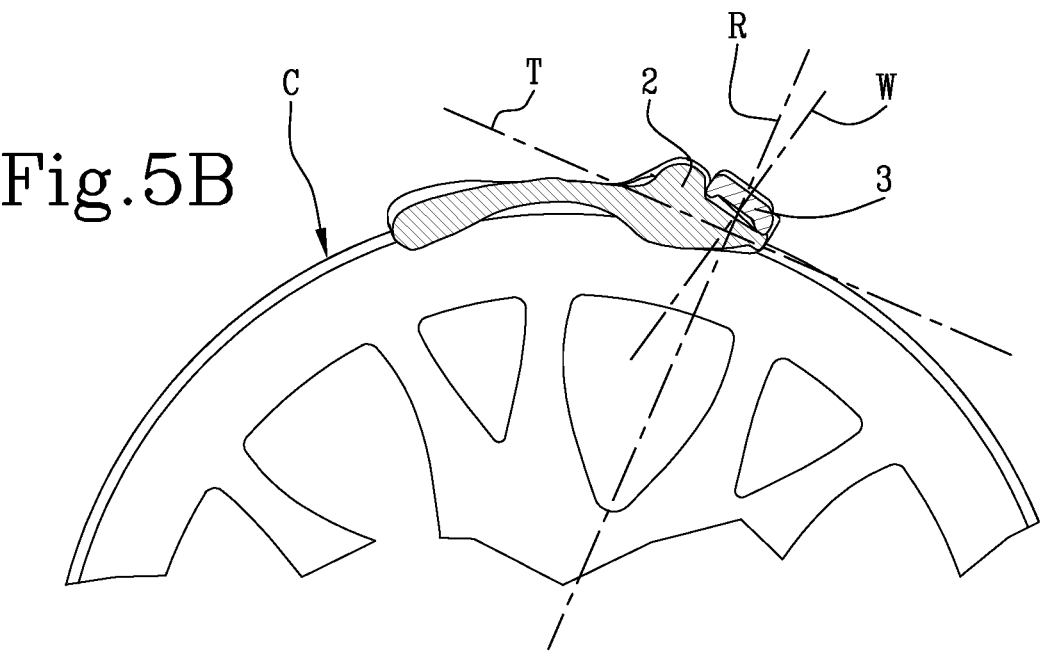

FIGS. 5A and 5B schematically illustrate a cross section from above of a first and a second embodiment of the apparatus of a gripping tool, respectively.

DETAILED DESCRIPTION

With reference to the accompanying drawings, the numeral 1 denotes a working head. The working head 1 is used in an apparatus 100 for demounting a tyre from a corresponding rim C of a vehicle wheel.

The apparatus 100 comprises a frame, which rests on the floor to support the apparatus 100. The frame comprises a column 101 which extends preferably along a vertical orientation V, parallel to the orientation of the weight force. In other embodiments, the apparatus 100 extends predominantly in a horizontal orientation. In such an embodiment of the apparatus 100, usually designed for demounting the wheels of heavy vehicles (and commonly known as heavy tyre changer), the column 101 extends in an orientation perpendicular to the orientation of the weight force. The apparatus 100 comprises a chuck 104. The chuck 104 rotates about an axis of rotation A.

The axis of rotation A is parallel to a main axis of extension of the column 101. Thus, in the case of heavy tyre changers, the axis of rotation A is perpendicular to the orientation of the weight force and, instead, in the case of light tyre changers, the axis of rotation is parallel to the vertical orientation V, hence parallel to the orientation of the weight force.

The chuck 104 is configured for holding the rim C. The chuck 104 is configured for entraining the rim in rotation about the axis of rotation A.

The apparatus 100 comprises a working arm 102 which extends between a first end 102A and a second end 102B. The working arm 102 is connected to the column 101. The apparatus 100 comprises a tube 108 which extends along an orientation parallel to the axis of rotation A. The working arm 102 is slidable in the tube 108 in parallel with the axis of rotation A. The working arm 102 is movable in parallel with the axis of rotation A relative to the tube, towards and/or away from the chuck 104.

In an embodiment, the apparatus comprises a spring 109. The spring 109 is interposed between the tube 108 and the first end 102A. The spring 109 is disposed along an orientation parallel to the axis of rotation, above the tube 108. The function of the spring 109 is to move the working arm 102 away from the rim C after the tyres have been demounted or mounted. In other terms, the spring 109 allows moving the working head 1 from a working position, close to the rim C, to a rest position, away from the rim C, when a tyre has finished being demounted or mounted. In an alternative embodiment, the movement of the arm, hence of the working head, along an orientation parallel to the axis of rotation is carried out by a cylinder (pneumatic or hydraulic).

In an embodiment, the column 101 extends between a first end 101A and a second end 101B. The frame 100 comprises a base 105. The frame comprises a slideway 106, located at the second end 101B. In an embodiment, the frame comprises a crossbeam 107, slidable in the slideway 106 along a radial orientation R, perpendicular to the axis of rotation A and passing through that axis of rotation, towards and/or away from the chuck 104.

The crossbeam 107 is connected to the tube 108.

In an embodiment, the working arm 102 is an articulated arm including one or more portions that are hinged to each other to vary the length of the working arm along the radial orientation R so as to move towards and/or away from the chuck 104.

In an embodiment, the apparatus 100 comprises an actuator 103. The actuator 103 is preferably a linear actuator. The actuator 103 is configured to allow a part actuated by it to move along the vertical orientation V. In effect, in an embodiment, the actuator is a piston and cylinder assembly in which the piston moves along the vertical orientation V. The actuator 103 is connected to the working head 1 and to the arm 102 (or to the tube 108, or to the seal spring 109). The actuator 103 is at least partly juxtaposed with the arm 102. In an embodiment, the actuator 103 is connected to the first end 102A of the working arm 102.

Thus, when the working arm 102 is moved along an orientation parallel to the axis of rotation of the chuck, the arm 102 withdraws into the tube 108 while the actuator 103 moves to a higher level but remains elastically connected to the tube by means of the spring 109.

The working head 1 is connected to one end of the working arm 102, specifically the second end 102B of the working arm.

The actuator 103 is connected to the working head 1 by a connecting rod 103' that connects the piston to the working head 1.

The connecting rod might be integrated in the piston; that is to say, it might be the stem of the piston itself. In an embodiment, the connecting rod 103' is tiltable relative to the piston. The connecting rod 103' is hinged to the piston.

The working head 1 comprises a contoured element 2. The contoured element 2 is a solid whose shape defines one or more parts having specific functions in the context of mounting and demounting the tyre to and from the respective rim.

The working head 1 comprises a gripping tool 3. The gripping tool 3 is configured for gripping the tyre. The gripping tool 3 is configured for lifting the tyre relative to the rim C so as to prise the tyre off the rim C.

The working head 1 comprises a transmission unit 4. The transmission unit 4 is configured for transmitting motion and/or transforming the motion of the actuator 103 into a movement of the gripping tool 3.

Thus, the transmission unit 4 is connected (connectable) to the actuator 103, for example, by the connecting rod 103'. The transmission unit 4 is also connected to the gripping tool 3. The transmission unit 4 is connected (connectable) to the working arm 102.

In a preferred embodiment, the contoured element 2 is connected to the working arm 102. The contoured element 2 is connected directly to the working arm 102. The contoured element 2 is connected to the working arm 102 by a first connector 51. The transmission unit 4 is connected to the working arm 102 by a second connector 52. In a preferred embodiment, the first and the second connector 51, 52 are separate from each other. In other words, the contoured element 2 and the transmission unit 4 are connected to the working arm 102 independently of each other. Preferably, the contoured element 2 is removable from the working arm 102 independently of removing the transmission unit 4.

The contoured element 2 extends along a longitudinal orientation L between a first end 2A (facing in a first direction V1), configured to be connected to the working arm 102, and a second end 2B (facing in a second direction V2, opposite to the first direction V1), configured to come into operative contact with the wheel rim C. When the working head 1 is mounted on the apparatus 100, the longitudinal orientation L is parallel to the axis of rotation A of the chuck 104.

The contoured element 2 comprises a mounting guide 21. The contoured element 2 comprises a demounting guide 22. The mounting guide 21 is spaced from the demounting guide 22 along a transverse orientation T perpendicular to the longitudinal orientation L. It is also possible to define a working orientation W which, in one embodiment, is perpendicular to the longitudinal orientation L and to the transverse orientation T. In an embodiment, the working orientation W passes operatively through the axis of rotation A of the chuck 104. In other words, when the working head 1 is mounted on the apparatus 100, the working orientation W coincides with a radial orientation R.

The gripping tool 3 is movable between a gripping position PP, where it is operatively interposed between the rim C and the tyre of the wheel, and a prising position PS, where it is disposed above the second end 2B of the contoured element 2 along the longitudinal orientation L (that is, spaced from the second end along the longitudinal orientation L in the first direction V1). At the gripping position PP, the gripping tool 3 is disposed under the second end 2B of the contoured element 2 along the longitudinal orientation L (that is, it is spaced along the longitudinal orientation L in the second direction V2).

The gripping tool is movable in a working plane defined by the transverse orientation T and the working orientation W.

The gripping tool 3 moves in a working plane defined by the longitudinal orientation L and the working orientation W.

In an embodiment, the contoured element 2 is made as a single part (that is, in one piece). In an embodiment, the contoured element 2 is made of polymeric material. In an embodiment, the contoured element 2 is made of hard plastic.

In an embodiment, the contoured element 2 is in sliding contact with the rim C while the chuck 104 is driven in rotation.

In a preferred embodiment, the mounting guide 21 and/or the demounting guide 22 are made as a single part (that is, in one piece) with the contoured element 2: that is, they are defined by corresponding protrusions of the contoured element 2.

The first end 2A of the contoured element 2 defines a connecting zone. In an embodiment, the connecting zone comprises a flat surface 24 which is substantially perpendicular to the longitudinal orientation L. The flat surface 24 includes one or more connecting openings. In an embodiment, the connecting zone comprises a longitudinal hooking surface which is oriented in the longitudinal orientation L. In this embodiment, the longitudinal hooking surface is configured to be connected to the working arm 102 in a longitudinal surface of it, parallel to the longitudinal orientation L.

The arm 102, at the second end 102B of it connected to the contoured element 2, comprises a connecting plate 1021. The connecting plate includes a plurality of holes which are longitudinally aligned with the one or more openings made on the flat surface 24 of the contoured element 2. The working head 1 comprises first connector elements 51 which are inserted into the one or more openings of the flat surface and into the plurality of holes of the connecting plate 1021, to fix the contoured element 2 to the working arm 102.

The second end 2B of the contoured element is configured to remain in sliding contact with the rim C.

More specifically, in an embodiment, the contoured element comprises a longitudinal portion 23, which is operatively interposed between the rim C and the tyre. The longitudinal portion 23 extends predominantly along the longitudinal orientation L and is configured to come into contact with a lateral surface C1 of the rim facing it along the working orientation W.

In an embodiment, the contoured element 2 comprises a supporting portion 25 which extends along an orientation that is substantially perpendicular to the longitudinal orientation L. The supporting portion 25 is configured to come into contact with and/or into abutment against a top surface C2 of it, perpendicular to the axis of rotation A (that is, to the longitudinal orientation L).

The longitudinal portion 23 and the supporting portion 25 together define an arcuate profile PA of the contoured element 2.

The demounting guide 22 is defined by a protuberance of the contoured element 2 facing the tyre. The demounting guide 22 is configured to supportably receive the tyre which has been lifted by the gripping tool 3. The demounting guide 22 is configured to remain in sliding contact with the tyre while the wheel is driven in rotation on the chuck 104. This facilitates progressively prising the tyre to remove it from the rim.

In an embodiment, the demounting guide 22 is included in the longitudinal portion 23. In an embodiment, the demounting guide 22 is out of alignment with the gripping tool 3 along the working orientation W.

In an embodiment, the mounting guide 21 is defined by a protuberance of the contoured element 2 (another protuberance different from the protuberance constituting the demounting guide). The protuberance that defines the mounting guide 21 extends along the working orientation; this protuberance is spaced from the demounting guide 22 along the transverse orientation. In the transverse orientation, the contoured element 2 has a first side and a second side, opposite to the first side. The protuberance that defines the mounting guide 21 is located on the second side, while the protuberance that defines the demounting guide 22 is located on the first side. In an embodiment, the first side of the contoured element 2 is interposed between the second side and the gripping tool 3.

In an embodiment, the contoured element 2 comprises an inserting portion 27. The inserting portion 27 is configured to push the tyre bead downwards (that is, in the second direction V2), allowing it to be inserted into a groove in the rim.

In an embodiment, the inserting portion 27 is longitudinally aligned with the demounting guide 22. In an embodiment, the inserting portion 27 juts from the demounting guide 22 along the longitudinal orientation in the second direction. Thus, the inserting portion 27 is located on the first side.

In an embodiment, the contoured element comprises a fin 28 which extends along an orientation that is inclined to both the longitudinal orientation L and the transverse orientation T.

In an embodiment, the mounting guide 21 is spaced from the inserting portion 27 and/or from the demounting guide 22 along the transverse orientation T. The inserting portion 27 is configured to push the tyre bead to allow it to be eased over an outer edge of the rim C into a corresponding groove of the rim C. The mounting guide 21, on the other hand, is configured to guide the tyre bead which is being progressively inserted by the inserting portion 27.

The inserting portion 27 is made as a single part with the mounting guide 21 and the demounting guide 22 to form the contoured element 2.

The mounting guide 21 is out of alignment with the gripping tool 3 along the working orientation W. The mounting guide 21 is out of alignment with the demounting guide 22 along the working orientation W.

In a preferred embodiment, the gripping tool 3 is disposed along the transverse orientation T on the same side as the demounting guide 22 and the mounting guide 21. In other words, the demounting guide 22 is interposed, along the transverse orientation T, between the mounting guide 21 and the gripping tool 3.

In an embodiment, the contoured element does not impinge on the working plane.

In an embodiment, the contoured element 2 impinges on the working plane. In an embodiment, the contoured element 2 comprises a protecting portion 26. The protecting portion 26 is aligned with the gripping tool 3 along the working orientation W. In other words, the protecting portion impinges on the working plane. The protecting portion 26 is included in the longitudinal portion 23 of the contoured element 2.

The protecting portion 26 is interposed between the rim C and the gripping tool 3 along the working orientation W at at least one position of the gripping tool 3.

That way, the protecting portion 26 is able to prevent the gripping tool 3 from impacting against the rim C and potentially damaging it.

The protecting portion 26 is behind the demounting guide 22 along the working orientation W.

The gripping tool 3 comprises a body 30. The body 30 extends between a first end 3A and a second end 3B. The first end 3A is connected to the actuator 103. The body 30 has a curved shape, defining a crest 301, interposed between the first end 3A and the second end 3B. The crest defines the portion that is furthest away from the rim C when the gripping tool 3 is at the gripping position PP.

The gripping tool 3 comprises a hook 31. The hook 31 is located at the second end 3B of the gripping tool 3. The hook 31 is configured for gripping the tyre.

In an embodiment, the hook 31 is movable between an extracted position PE, where the hook 31 protrudes from the body 30 of the gripping tool 3 in the working orientation W, and a retracted position, where the hook 31 is withdrawn onto the body 30 of the gripping tool and does not protrude from it along the working orientation W.

In an embodiment, the hook 31 is connected to the body 30 by a spring. The spring is configured to keep the hook at the extracted position PE. In an embodiment, the hook 31 has a protuberance at one end of it to make it easier to engage the tyre when the hook is at the extracted position PE.

That way, when the gripping tool 3 is pushed between the tyre and the rim C, the hook withdraws to the retracted position. After engaging the tyre—that is, when the hook is inside the tyre—the spring acts on the hook 31 so it springs back to the extracted position PE, where it can correctly grip the tyre.

At its first end 3A, the gripping tool 3 comprises a transmission hinge 32. The transmission hinge 32 is connected to the connecting rod 103' of the actuator 103.

That way, the thrust received from the actuator 103 is transferred to the gripping tool 3.

In an embodiment, the gripping tool 3 comprises a first coupling hole 33 and a second coupling hole 34.

The second end 3B of the gripping tool 3 (or one end of the gripping tool 3) where the hook 31 is located, adopts a first position along the working orientation W when the gripping tool 3 is at the prising position PS. The second end 3B of the gripping tool 3 adopts a second position corresponding to a position of the gripping tool 3 between the prising position PS and the gripping position PP.

The transmission unit 4 comprises a support 41. The support 41 comprises a connecting hub 411 which is configured to be connected to the working arm 102. The connecting hub 411 is linked to the working arm 102 by second connector elements 52. The connecting hub 411 is coupled to a portion of the working arm 102 that is smaller in diameter than the other portions of the working arm 102.

The connecting hub 411 is located above the contoured element 2 along the longitudinal orientation L.

The support 41 comprises a spacing portion 412. The support 41 comprises an interface portion 413. The interface portion 413 is connected to the gripping tool 3. The spacing portion 412 extends along the transverse orientation T to space the connecting hub 411 from the interface portion 413.

In an embodiment, the interface portion 413 is transversely spaced from the contoured element 2. More specifically, the interface portion 413 is transversely spaced from the mounting guide 21 and from the demounting guide 22 of the contoured element 2.

In an embodiment, the interface portion 413 is, however, aligned with the protecting portion 26 of the contoured element 2 along the longitudinal orientation L.

The transmission unit comprises one or more of the following components:
a sliding slot 42;
a first hinge 43;
a second hinge 45;
a third hinge 44;
a lever 46.

More specifically, the first hinge 43 and the third hinge 44 are connected to the first coupling hole 33 and to the second coupling hole 34, respectively. The first hinge 43 is located higher up than the third hinge 44 along the body 30 of the gripping tool (that is, along the longitudinal orientation L). In addition, the transmission hinge is located higher up than the first hinge 43 along the longitudinal orientation L.

The first hinge 43 is configured to slide in the slot 42 between a first limit stop FC1, corresponding to the prising position PS of the gripping tool 3, and a second limit stop FC2, corresponding to the gripping position PP of the gripping tool 3.

In a plane parallel to the working plane, the slot 42 has a curved profile. More specifically, the curved profile has a variable curvature radius. More specifically, the profile comprises a first stretch T1, having a first curvature radius, and a second stretch T2, having a second curvature radius, greater than the first curvature radius. The first stretch T1 extends from the first limit stop FC1. The second stretch T2 ends at the second limit stop FC2.

The variable curvature radius allows varying the kinematic parameters of the motion of the gripping tool 3.

The lever 46 is connected to the support 41 by the second hinge 45. The second hinge 45 is thus the centre of rotation of the lever 46. More specifically, the lever 46 rotates about an axis passing through the hinge 45. The lever 46 is also connected to the third hinge 44. Thus, the point on the body 30 where the third hinge 44 is constrained to follow a circular trajectory whose radius is equal to a length of the lever 46.

The angle swept by the lever 46 corresponds to the movement of the gripping tool 3 between the prising position PS and the gripping position PP. According to an aspect of it, this disclosure provides a method for demounting a tyre from a respective vehicle wheel rim C.

The method comprises a step of positioning the wheel on a chuck of the tyre changing apparatus 100.

The method comprises a step of moving the working head 1 of the apparatus 100 (reciprocally) towards the chuck 104 along the longitudinal orientation L, in parallel with the axis of rotation A.

In an embodiment, the method comprises a step of moving the working head along the radial orientation R of the working head so it can move closer to the rim to adapt to different rim diameters.

The method comprises a step of resting a contoured element 2 of the apparatus 100 on the wheel rim C at a supporting zone of the contoured element 2.

The method comprises a step of guiding the tyre with the demounting guide 22 of the contoured element 2 while the wheel rotates.

The step of guiding is performed by the demounting guide 22, with the demounting guide 22 positioned alongside the mounting guide 21 along a transverse orientation T perpendicular to the longitudinal orientation L.

The method comprises a step of moving a gripping tool 3 in a working plane, including the axis of rotation A and perpendicular to the transverse orientation T, between a gripping position PP, where it is interposed between the rim and the tyre, and a prising position PS, where the gripping tool 3 is lifted longitudinally relative to the rim C.

The step of moving the gripping tool 3 is performed by an actuator 103.

The step of moving the gripping tool 3 is performed through a transmission unit 4 which converts the pushing motion of the actuator 103 into a movement of the gripping tool along a predetermined working path.

The method comprises a step of rotating the chuck 104 about an axis of rotation A.

In the step of guiding, the demounting guide 22 is interposed between the mounting guide 21 and the gripping tool 3 along the transverse orientation T.

In the step of moving the gripping tool, the linear movement of the actuator 103 is transmitted by a connecting rod 103'.

The method comprises a step of connecting the contoured element to the working arm 102, in which the contoured element 2 is connected to the working arm 102, preferably directly to the working arm 102. This step of connecting is performed through a first connector 51.

The method comprises a step of connecting the transmission unit 4 to the working arm 102 through a second connector 52, distinct from the first connector 51.

The method comprises a step of removing (or replacing) the contoured element 2, preferably independently of removing and/or replacing the gripping tool 3.

The method comprises a step of contacting longitudinally. In the step of contacting longitudinally, a longitudinal portion 23 extending predominantly along the longitudinal orientation L is interposed between the rim C and the tyre. The longitudinal portion 23 comes into contact with a lateral surface C1 of the rim facing it along the working orientation W.

The method comprises a step of supporting at the top, in which a supporting portion 25 extending along an orientation substantially perpendicular to the longitudinal orientation L comes into contact with and/or abuts against a top surface C2 of the rim C, perpendicular to the longitudinal orientation L.

In any case, contact between the contoured element 2 and the rim C is made at an arcuate profile PA of the contoured element 2 defined by the longitudinal portion 23 and by the supporting portion 25.

In the step of guiding, the demounting guide 22 supportably receives the tyre which has been lifted by the gripping tool 3. The demounting guide 22 remains in sliding contact with the tyre while the wheel is driven in rotation on the chuck 104.

The method also applies to the possibility of mounting the tyre to the rim C. In such a case, the method comprises a step of inserting, in which an inserting portion, defined by a protuberance of the contoured element 2, pushes the tyre bead to allow it to be eased over an outer edge of the rim C into a corresponding groove of the rim C. In such a case, the method comprises a step of guiding, during mounting, in which a mounting guide 21 guides a tyre bead while the wheel is being driven in rotation and the tyre is progressively fitted to the rim C.

The method comprises a step of protecting in which the rim C is protected against impacts with the gripping tool 3.

In the step of protecting, the contoured element 2 impinges on the working plane at a protecting portion 26.

The protecting portion 26 is positioned between the rim C and the gripping tool 3 along the working orientation W at at least one position of the gripping tool 3—for example, at the gripping position PP of the gripping tool 3. That way, the protecting portion 26 is able to prevent the gripping tool 3 from impacting against the rim C and potentially damaging it.

The method comprises a step of gripping, in which a hook 31 of the gripping tool 3 grips the tyre.

The method comprises a step of moving the hook 31 between an extracted position PE, where the hook 31 protrudes from the body 30 of the gripping tool 3 in the working orientation W, and a retracted position, where the hook 31 is withdrawn onto the body 30 of the gripping tool and does not protrude from it along the working orientation W. In an embodiment, the movement is accomplished by a spring which keeps the hook at the extracted position PE. The tool is inserted between the tyre and the rim C. During insertion, the pushing action of the gripping tool 3 causes the hook 31 to close until it passes the tyre and springs back to the extracted position to grip the tyre securely.

In an embodiment, the step of moving the gripping tool 3 comprises a step of rotating about a transmission hinge 32 that is connected to the connecting rod 103' of the actuator 103.

In the step of moving the gripping tool, the second end 3B of the gripping tool 3 (or one end of the gripping tool 3) where the hook 31 is located, moves along the working orientation W between a first position, corresponding to the prising position PS of the gripping tool 3, and a second position, corresponding to a position of the gripping tool 3 between the prising position PS and the gripping position PP.

In an embodiment, in the step of connecting the transmission unit 4 to the working arm 102, a connecting hub 411 of the transmission unit 4 is connected to the working arm 102 by second connector elements 52.

The step of transmitting comprises one or more of the following steps:
  sliding a first hinge 43, associated with the gripping tool 3, in a sliding slot 42 between a first limit stop FC1, corresponding to the prising position PS of the gripping tool 3, and a second limit stop FC2, corresponding to the gripping position PP of the gripping tool 3; in an embodiment, the first hinge slides in the slot 42 along a curved path whose curvature radius is preferably variable; the first hinge 43 moves along a first stretch T1, extending from the first limit stop FC1 and having a first curvature radius, and a second stretch T2, ending at the second limit stop FC2 and having a second curvature radius, greater than the first curvature radius;
  rotating the gripping tool 3 about the connecting hinge 32;
  rotating a lever 46 about a second hinge 45, connected to a support 41 of the transmission unit;
  rotating the lever 46 about a third hinge 44, connected to the gripping tool 3.

The invention claimed is:

1. A working head for an apparatus for mounting and demounting a tyre to and from a corresponding rim of a vehicle wheel, the working head comprising:
  a contoured element, made of polymeric material and having a first end and a second end, spaced from each other along a longitudinal orientation, wherein the first end faces in a first direction and defines a connecting zone of the contoured element and the second end faces in a second direction, opposite to the first direction and defines a supporting zone of the contoured element, adapted to abut against the wheel rim with the contoured element in sliding contact with the rim, the contoured element including a demounting guide, adapted to come into sliding contact to guide the wheel tyre, and a mounting guide, juxtaposed with the demounting guide along a transverse orientation perpendicular to the longitudinal orientation and adapted to come into sliding contact to guide the tyre while it is being mounted to the wheel rim;

a gripping tool, movable in a working plane perpendicular to the transverse orientation between a gripping position, where it is operatively interposed between the rim and the tyre, and a prising position, where the gripping tool is lifted longitudinally relative to the second end of the contoured element;

a transmission unit connectable to an actuator and to the gripping tool and configured to move the gripping tool between the gripping position and the prising position responsive to a movement of the actuator, wherein the demounting guide is interposed, along the transverse orientation, between the gripping tool and the mounting guide of the contoured element, and wherein the contoured element is removably connected to an arm of the apparatus; and wherein the contoured element comprises a protecting portion impinging on the working plane, so that the protecting portion is interposed between the rim and the gripping tool along a working orientation, the working orientation being perpendicular to the longitudinal orientation and to the transverse orientation, when the gripping tool is in the gripping position, and wherein the demounting guide protrudes towards the tyre in the working orientation with respect to the protecting portion, and the demounting guide is interposed, along the transverse orientation, between the protecting portion and the mounting guide.

2. The working head according to claim 1, wherein the contoured element, at its second end, includes an arcuate profile, configured to rest on the wheel rim and including a longitudinal portion which is operatively disposed between the rim and the tyre.

3. The working head according to claim 1, wherein the contoured element is connectable to the arm by a first connector and wherein the transmission unit is connectable to the arm of the apparatus by a second connector, distinct from the first connector.

4. The working head according to claim 1, wherein the contoured element impinges on the working plane.

5. The working head according to claim 1, wherein the contoured element is made as a single part, made of polymeric material.

6. The working head according to claim 5, wherein the contoured element is made of hard plastic.

7. The working head according to claim 6, wherein the first stretch of the slot includes the first limit stop.

8. The working head according to claim 5, wherein the slot comprises a first limit stop, corresponding to the prising position of the gripping tool, and a second limit stop, corresponding to the gripping position of the gripping tool, and wherein the slot comprises a first stretch, having a first profile, and a second stretch, distinct from the first stretch and having a second profile, different from the first profile.

9. The working head according to claim 5, wherein the transmission unit comprises a support and wherein the transmission unit comprises a lever which rotates relative to the support about a second hinge and wherein the gripping tool is connected to the lever by a third hinge.

10. The working head according to claim 1, wherein the transmission unit comprises a transformation mechanism, configured to transform a linear movement of the actuator into an operating path of the gripping tool including at least one curved stretch, and wherein the transformation mechanism comprises a slot, the gripping tool being connected to the transmission unit by a first hinge which is slidable in the slot responsive to the linear movement of the actuator.

11. The working head according to claim 1, wherein the gripping tool is in the form of an elongate lever having a hook-shaped free end.

12. The working head according to claim 1, wherein the gripping tool comprises an elongate body and a claw which is movable between a retracted position and an extracted position, where it operatively protrudes from the body towards the tyre along the working orientation.

13. A tyre changing apparatus for mounting and demounting a tyre to and from a vehicle wheel rim, comprising:
a frame, including a column;
a chuck, rotatable about an axis of rotation and configured to set the wheel in rotation;
a working arm, connected to the column and oriented at least partly along a longitudinal orientation parallel to the axis of rotation;
a working head, according to claim 1, connected to the working arm and reciprocally movable towards and away from the chuck along the longitudinal orientation; and
an actuator, connected to the transmission unit of the working head to drive the gripping tool.

14. A method for mounting and demounting a tyre to and from a vehicle wheel rim by means of a tyre changing apparatus, the method comprising the following steps:
positioning the wheel on a chuck of the tyre changing apparatus, the chuck being adapted to set the wheel in rotation about an axis of rotation;
moving a working head of the apparatus towards the chuck along a longitudinal orientation, in parallel with the axis of rotation;
resting a contoured element of polymeric material, forming part of the working head, on the wheel rim at a supporting zone of the contoured element, the contoured element including a demounting guide, adapted to come into sliding contact to guide the wheel tyre, and a mounting guide juxtaposed with the demounting guide along a transverse orientation perpendicular to the longitudinal orientation and adapted to come into sliding contact to guide the wheel tyre when the tyre is being mounted on the rim;
moving a gripping tool in a working plane, including the axis of rotation and perpendicular to the transverse orientation, between a gripping position, where it is interposed between the rim and the tyre, and a prising position, where the gripping tool is lifted relative to the rim, the step of moving the gripping tool being performed by an actuator through a transmission unit included in the working head;
rotating the chuck about the axis of rotation;
guiding the tyre with the demounting guide of the contoured element while the wheel rotates,
wherein the demounting guide is interposed between the mounting guide and the gripping tool along the transverse orientation; and
wherein the contoured element comprises a protecting portion impinging on the working plane, so that the protecting portion is interposed between the rim and the gripping tool along a working orientation, the working orientation being perpendicular to the longitudinal orientation and to the transverse orientation, when the gripping tool is in the gripping position, and wherein the demounting guide protrudes towards the tyre in the working orientation with respect to the protecting portion, and the demounting guide is interposed, along the transverse orientation, between the protecting portion and the mounting guide.

15. The method according to claim 14, comprising a step of replacing the contoured element, wherein the contoured element is removed from the working head to be replaced with a new contoured element.

16. The method according to claim 14, comprising a step of protecting in which the contoured element is interposed between the gripping tool and the rim, in the working plane, to prevent damage to the rim due to impact against the gripping tool.

* * * * *